Aug. 11, 1936.   R. E. McCLURE   2,050,720
CONTROL DEVICE
Original Filed Nov. 28, 1934   2 Sheets-Sheet 1

INVENTOR
Robert E. McClure
by his attorneys
Byrnes, Stebbins & Bienko

Aug. 11, 1936.  R. E. McCLURE  2,050,720
CONTROL DEVICE
Original Filed Nov. 28, 1934  2 Sheets-Sheet 2
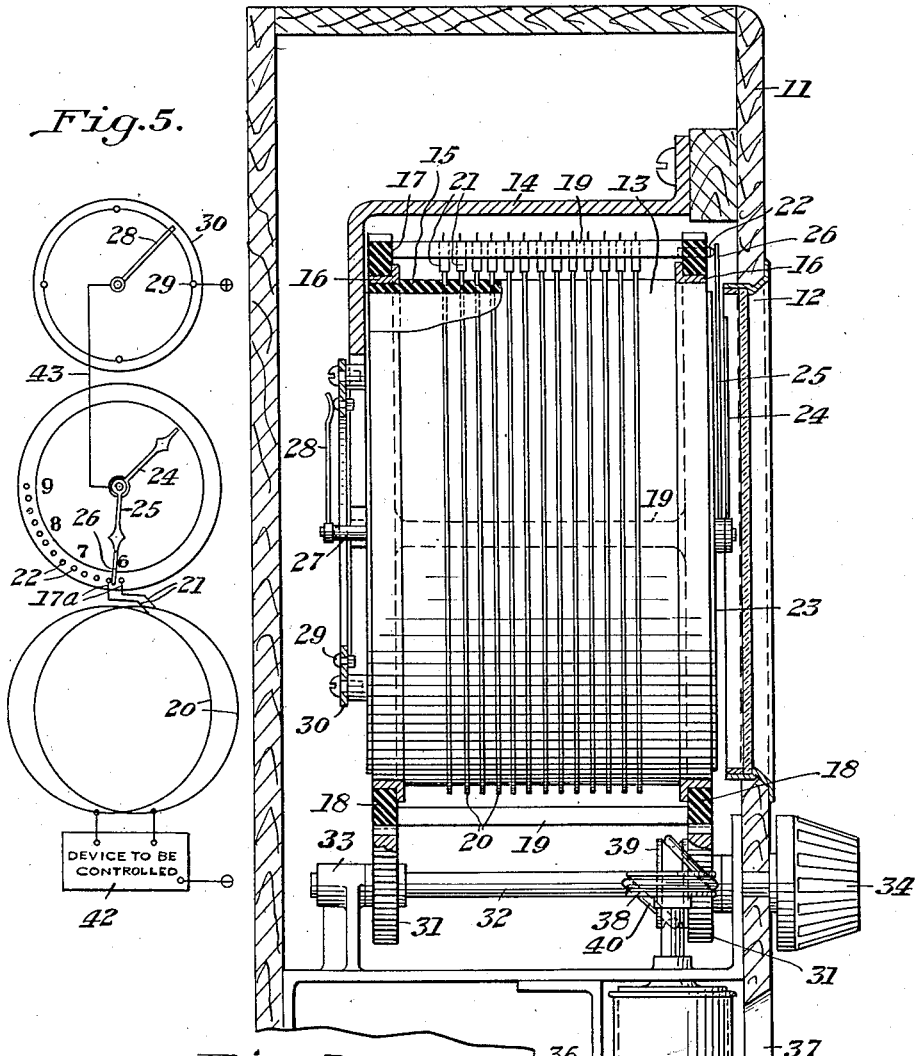
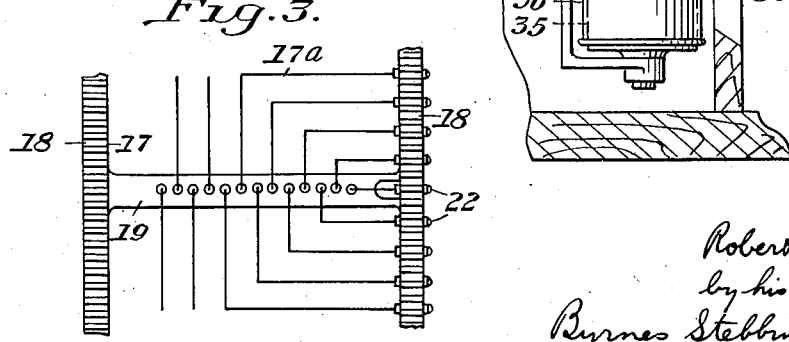
INVENTOR
Robert E. McClure
by his attorneys
Byrnes, Stebbins & Blenko Patented Aug. 11, 1936

2,050,720

UNITED STATES PATENT OFFICE 2,050,720

CONTROL DEVICE

Robert E. McClure, Warren, Ohio, assignor to Raymond J. Wean, Warren, Ohio

Original application November 28, 1934, Serial No. 755,169. Divided and this application April 24, 1935, Serial No. 17,945

6 Claims. (Cl. 200—37)

My invention relates to a control device and, in particular, to a control device adapted to become operative at predetermined times, such as a control clock.

The invention described and claimed herein is carved from the disclosure of my copending application Serial No. 755,169, filed November 28, 1934, for Automatic time-controlled tuning mechanism for radio receivers.

Control clocks as known heretofore have been characterized by great complexity of connections and high cost, which have restricted the use of such devices to relatively few installations. I have invented a simple form of control clock which avoids the aforementioned objections to previous devices and greatly extends the field of application of timed control.

The complexity of previous control clocks has resulted from the attempt to provide contacts and circuits for each particular division of time for which the clock is set to operate. A clock intended to effect automatic control of the device at quarter hour intervals, for example, has required no less than 48 contacts and independent circuits. When it is attempted to effect automatic control for shorter periods, say every five minutes or every minute, it is apparent that the complication of contacts and circuits becomes utterly impossible.

I have observed that the large majority of timed control applications involve automatic control for only a relatively short period. In accordance with my invention, therefore, I provide a control clock capable of effecting automatic control of any desired device for a limited period only, such as three or four hours, and construct the clock so that the period of automatic control can be shifted to any particular time at which automatic control is desired. I thus utilize only a few contacts and circuits but am able thereby to effect automatic control at any desired time for a predetermined limited period.

For a detailed explanation of the invention, reference is made to the accompanying drawings illustrating a present preferred embodiment, although it will be understood that the invention may be otherwise embodied within the scope of my broader claims. In the drawings:

Figure 2 is a vertical section through the axis of the hands of the clock's face shown in Figure 1, with parts shown in elevation and parts broken away;

Figure 3 is a partial plan view of a detail;

Figure 5 is a circuit diagram illustrating one application of the invention.

Figure 1:
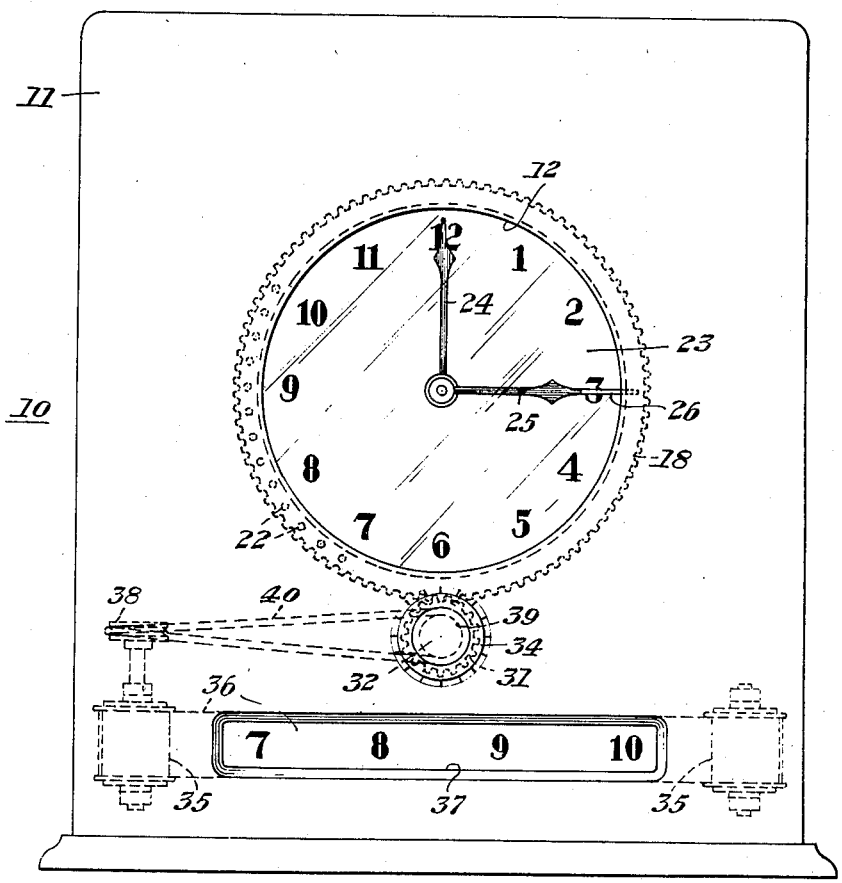
Figure 1 is a front elevation of a control clock in accordance with my invention.

Referring now in detail to the drawings, a control clock 10 comprises an outer case 11 of any suitable construction having a glazed window or opening 12 therein. The clock mechanism is enclosed in an inner case 13 mounted on the interior of the case 11 by means of a bracket 14 so that the clock hands may be observed through the opening 12 as shown in Figure 1.

The inner case 13 is provided with an insulating sleeve 15 having annular guides 16 mounted adjacent the ends thereof. A cage or frame 17 of insulating material including end rings 18 and cross bars 19, is rotatably mounted on the sleeve 15, the end rings 18 cooperating with the guides 16. A plurality of slip rings 20 are disposed side by side in spaced relation along the length of the sleeve 15. One of the cross bars 19 carries a plurality of brushes 21 making contact with the slip rings. Independent control circuits (not shown) extend from the several slip rings 20 to the device or devices to be controlled. The conductors for these circuits may be formed into a cable and the latter introduced into the case 11 at any convenient point, preferably through the back of the inner case 12.

The end ring 18 of the cage 17 adjacent the face of the clock has a plurality of contacts 22 thereon. These contacts are positioned with regard to the time interval between successive automatic operations to be caused by the clock, and are connected to the brushes 21 by conductors 17a. The clock enclosed within the case 13 has a face 23, a minute-hand 24, and an hour-hand 25. The hour-hand has a conducting extension 26 adapted to engage the contacts 22 successively as the hour-hand moves. The spindle on which the minute-hand 24 is mounted is extended through the rear wall of the case 13, as shown at 27, and is provided with a contact finger 28 adapted to engage successively a plurality of contacts 29 spaced around a conducting ring 30 mounted on the rear wall of the case 13. The purpose of the finger 28 is finally to close the control circuit at precisely the desired instant, after it has initially been set up by engagement of the hour-hand extension 26 with one of the contacts 22, in a manner which will be described later.

The peripheries of the end rings 18 are toothed for cooperation with actuating pinions 31 mounted on a shaft 32 journaled in suitable bearings 33 within the case 11. The shaft 32 extends through the front wall of the case 11 and has an adjusting knob 34 thereon. By turning the knob 34, obviously, the positions of the contacts 22 relative to the clock face and hands, may be altered as desired. The contacts may thus be positioned to effect automatic control in a fixed sequence for any selected period of the day or night. For indicating the setting of the control contacts at any time, I provide a pair of sheaves 35 journaled vertically in suitable bearings within the case 11. An indicating tape 36 is graduated to correspond with the clock face and the sheaves 35 are so located that the tape is visible through a window or slot 37 in the front wall of the case 11. One of the sheaves 35 carries a pulley 38. The shaft 32 carries a cooperating pulley 39 and the sheaves 35 are thus driven from the shaft 32 through the pulleys and a belt 40 trained therearound. Once the tape 36 has been properly positioned on the sheaves, it will always indicate the position of the contacts 22 relative to the clock face. In the illustrated embodiment, the contacts 22 are shown in Figure 1 as set to effect automatic control between the hours of 7:00 and 10:00. The tape 36 gives a visible indication of this setting.

Figure 4:
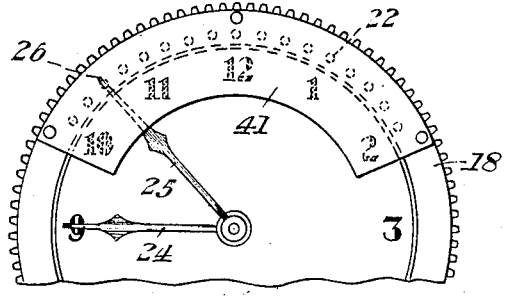
Figure 4 is a partial elevation of a modified form of the invention.

Figure 4 illustrates a slightly modified form of means for indicating the setting of the contacts at any particular time. According to this form of the invention, a colored translucent shield 41 is attached to the front end ring 18 in spaced relation thereto so as to avoid interference with the engagement of the contacts 22 by the hour-hand extension 26. The shield overlies the contacts 22, as shown in Figure 4, and moves with them as the cage is adjusted about the clock dial. It thus indicates the adjustment of the control contacts by partially obscuring the hours through which the contacts are positioned to operate. The modification of Figure 4 is provided to effect automatic control through a period of four hours instead of three, as shown in Figure 1. Obviously, the invention may be designed to provide automatic control in fixed sequence for any desired period and for any desired frequency within such period, merely by appropriately designing the cage 17 as to the number and spacing of the contacts 22.

Figure 5 illustrates diagrammatically the circuit connections of the various portions of the device. The device to be controlled is indicated diagrammatically at 42 and may be of any character desired. I have shown two connections between the device 42 and adjacent slip rings 20. These connections might control, for example, the "on" and "off" relays of a domestic heating plant or cooling range. The invention may also be employed to control separate and independent devices. It will be understood that the invention has a wide variety of applications and the nature of the particular device being controlled is, therefore, beyond the scope of the invention. The slip rings 20 are connected through the brushes 21 and the connections 17a to the contacts 22. The hour-hand 25 and the contact finger 28 are electrically connected through the clock mechanism, as indicated on the diagram of Figure 5 by a conductor 43. One side of a supply circuit is connected to the ring 30 which, of course, is insulated from the clock case, the other side of the supply being connected to the device or devices to be controlled.

In the embodiment shown, the contacts 22 are arranged to be engaged every quarter hour. As shown in Figure 5, when the hour hand 25 reaches the position indicating 6:15, the extension 26 will engage one of the contacts 22 and prepare a circuit for the device 42. This circuit, however, will not be closed until precisely the instant of 6:15 when the finger 28 which moves with the minute-hand 24 engages the contact 29 on the right in Figure 5. In this way, the operation of the device 42 is timed with great accuracy. A repetition of this cycle, of course, occurs for every engagement of a contact 22 by the extension 26.

It will be apparent from the foregoing description that the invention is characterized by numerous advantages over control clocks known heretofore, principally in the direction of simplicity and low cost of construction, as well as in accuracy of control and flexibility in application. It will also be recognized that the invention is not limited to the specific construction illustrated and described herein but is capable of wide variation as to arrangement and detail, without departing from the spirit of the invention or the scope of the appended claims.

I claim:

1. Automatic control mechanism comprising a clock having a case member, a cage member rotatable about the case member having contacts thereon, slip rings on one of said last-mentioned members and spaced axially of the case, brushes on the other, and means for rotating said cage member whereby the contacts may be adjusted to any position circumferentially of the case member.

2. The combination with a clock having a generally cylindrical case, an annular frame extending therearound and rotatable thereon, a plurality of contacts fixed on said frame in spaced relation circumferentially thereof, connections for said contacts including slip rings and brushes spaced axially of said frame, and a contact finger actuated by said clock for engaging said contacts successively.

3. The apparatus defined by claim 2 characterized by said clock being mounted in a case, an indicating tape movably mounted in the case and visible externally thereof through an opening therein, and means whereby said tape moves when the frame is rotated.

4. Contact making apparatus for mounting on a clock comprising an annular guide adapted to extend around the clock, an annular cage mounted on said guide for rotary movement about said clock, contacts fixed to said cage and spaced circumferentially therearound, cooperating brushes and slip rings for each of said contacts, said brushes and rings being spaced axially of said cage, and a contact finger driven by said clock for engaging said contacts.

5. Clock-controlled contact making apparatus comprising a plurality of slip rings spaced axially apart and disposed about a clock, a cage rotatable about the clock and having a plurality of contacts fixed therein in spaced relation circumferentially thereof, brushes cooperating with said rings whereby said contacts may be connected to a fixed device and adjusted relative to said clock.

6. The combination with a plurality of contacts adapted to be engaged successively by a moving contact traversing a predetermined path, said first mentioned contacts being fixed relative to each other, but movable together along said path whereby to be engaged by said moving contact at different times, of independent circuits connecting each of said first mentioned contacts to a fixed member, and a common connection from said circuits to said moving contact, whereby to energize said members sequentially at predetermined times.

ROBERT E. McCLURE.